Oct. 5, 1926.
C. Y. KNIGHT
1,601,918
PISTON AND ROD CONSTRUCTION
Filed June 8, 1923
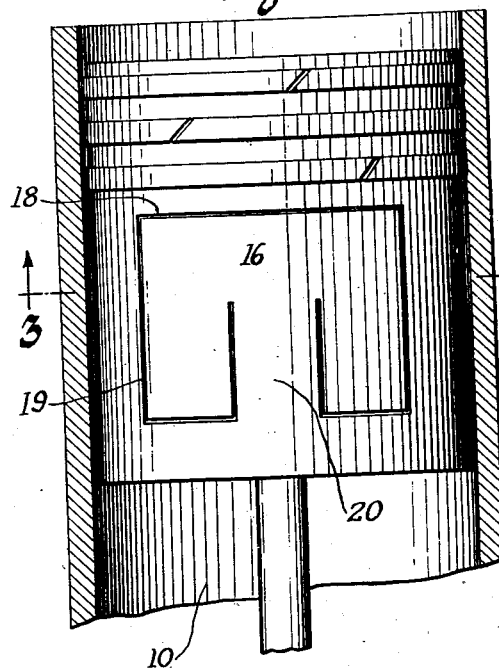
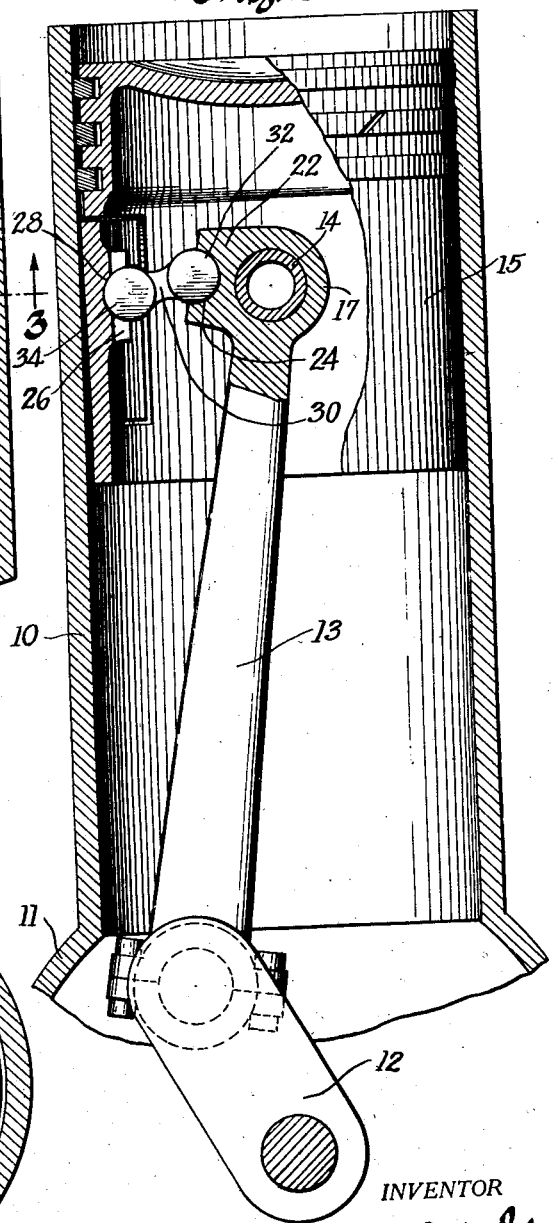
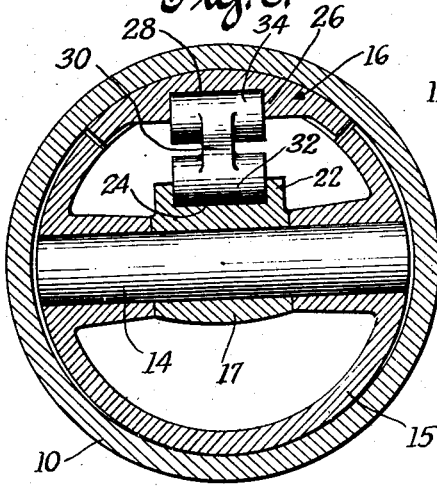
INVENTOR
Charles Y. Knight
BY
ATTORNEY Patented Oct. 5, 1926.

1,601,918

UNITED STATES PATENT OFFICE.

CHARLES Y. KNIGHT, OF PASADENA, CALIFORNIA, ASSIGNOR TO KNIGHT & KIL-BOURNE DEVELOPMENT CO., OF CHICAGO, ILLINOIS, A CORPORATION OF ILLINOIS.

PISTON AND ROD CONSTRUCTION.

Application filed June 8, 1923. Serial No. 644,103.

The present invention relates to an improvement upon the invention disclosed in my previous application, Serial Number 616,928, for means for holding piston against vibration at the end of the stroke, filed February 5th, 1923, which application relates to a broad novel means in connection with a reciprocating piston whereby lateral movement or tendency for lateral movement or piston slap at the end of the stroke of the piston, in its cycle of movement, is prevented, counteracted and eliminated, the construction, however, allowing free travel between the ends of the piston stroke.

An object of the present invention is to provide a simplified construction for accomplishing these ends in which the connection between the piston rod and movable part of the piston which is expanded at the ends of the piston stroke is such as to furnish a relatively large bearing surface so as to provide sufficient bearing to take the shock of the explosion especially, for example, when the latter is advanced so that the engine fires considerably ahead of dead center.

A further object is to provide a movable part in a piston to have a substantially rectilinear movement toward and away from the axis of the piston in its operation aforesaid in order to avoid binding and to provide an operating means preferably a link connection therefor which will furnish, as indicated, an extended bearing area.

Thus an object of the present invention is to provide a half ball and socket connection between the link connecting the piston rod with the movable gate or expanding piston as the case may be. In this manner, the line contact of the roller bearing connection is avoided and an extended area provided for a suitable joint having the advantages indicated.

A further object relates to a simplified construction in which the machining or other mechanical operations are reduced to a minimum.

Various other objects are within the scope of this invention such as relate to the arrangement of the related elements of the structure, to various details of construction; to economies of manufacture and to each of the other features of novelty as will appear from a consideration of the details of the drawing and related description of a form of the invention, which may be preferred, in which Figure 1 is a sectional view showing the expansible part of the piston;

Figure 2 is a sectional view showing the assembly;

Figure 3 is a transverse sectional view on the line 3—3 of Figure 1.

In the drawings, 10 represents the cylinder, 11 the crank case, 12 the engine crank, 13 the piston rod connected through the wrist pin 14 to the piston 15.

The piston is provided with an expansible portion 16 formed in this instance by the transverse top kerf 18, the parallel side longitudinal slots 19 connected at the base by slots arranged to form the connecting tongue 20 between the piston 15 proper and the movable portion 16 thereof. It will be noted by this type of hinge that the movement of the element 16 toward and away from the center of the piston is in a more or less rectilinear direction.

The head 17 of the piston rod 13 is provided with an extension 22 provided in turn with a semi-cylindrical shaped recess or socket 24 formed preferably by milling a half circular cut in the extension 22 to form the semi-cylindrical bearing. The gate 16 is provided with inwardly extending lugs 26 which may be cast integrally with the piston, which are likewise formed with the same type of semi-cylindrical sockets or recesses 28, the lugs 26 being arranged in such a manner as not to stiffen or interfere with the free hinging movement of the gate 16. A link 30 provided with semi-spherical bearings 32 and 34 is adapted to fit between the sockets 24 and 28 forming the operative connection between the engine rod 13 and the movable gate 16 with a strong and yet freely movable connection at each end of the link in order to further facilitate the rectilinear movement indicated and also form a larger and stronger bearing area by avoiding the line contact only of the roller type of bearing.

It will be understood that in the operation of the mechanism as the piston approaches the end of its stroke the link connection 30 tends to force the gate 16 outwardly against the wall of the cylinder 10 in a manner set forth in my co-pending application, above referred to.

It will be seen that the construction herein illustrated forms a particularly efficient joint between the piston and piston rod by reason of the half cylindrical socket connection as in this way a much larger area is provided for taking the shock especially at the upper end of the stroke when the ignition occurs and the force of the explosion is taken by the piston.

Moreover, the type of invention illustrated and described forms a particularly efficient connecting means between the piston rod and piston since there is very small change of angularity between the piston rod and the connecter and thus there is a minimum of strain produced during the cycle of movement of the piston.

It is apparent that within the spirit of the invention modifications and different arrangements may be made other than as herein disclosed, and the present disclosure is illustrative merely, the invention comprehending all variations thereof.

Having thus described my invention, what I desire to secure by Letters Patent of the United States and claim is:

1. In combination, a piston, a connecting rod having a bearing having a circular cross section, a movable part associated with said piston likewise provided with a bearing having a circular cross section and a link connecting said movable piston part and said connecting rod arranged to form a contact between said movable piston part and the cylinder wall at the ends of the piston stroke, said link having coacting bearings for the bearings in said connecting rod and movable piston part.

2. In combination, a piston, a connecting rod, a movable part associated with and forming a portion of said piston, a link between the connecting rod and said part and bearings on the piston and rod for the link, said bearings having extended contact surface areas.

3. In combination, a piston, a connecting rod having a semi-cylindrical bearing therein, a movable part associated with said piston and adapted to move substantially rectilinearly to and from the center of the piston at the ends of the piston stroke, said part having a semi-cylindrical bearing and a link between said connecting rod and movable part, having heads adapted to fit in each of said bearings in said connecting rod and movable part.

4. In combination, a piston, a connecting rod, a movable part associated with said piston arranged to be moved substantially rectilinearly toward and away from the center of the piston, and a link connecting said movable part and said connecting rod arranged to form a contact between said part and the cylinder wall at the ends of the piston stroke, said link having coacting bearings at each end thereof for said connecting rod and said movable part.

5. In combination, a piston, a connecting rod having an extension on its head, a movable part associated with said piston and a link connecting said part and said connecting rod extension arranged to form a contact between said part and the cylinder wall at the ends of the piston stroke, said extension having a semi-cylindrical bearing formed by milling a semi-circular recess therein, and a coacting element on said link for said bearing.

6. In a structure of the class described, the combination of a piston head having a depending skirt, a piston rod pivotally connected to said head, a link interposed between the pivot head of said piston rod and said skirt, said link having solid cylindrical bearings at either end forming pivotal engaging members with said skirt and said piston rod head.

7. In a piston head construction, the combination of a piston head having a depending skirt, a portion of which is partially separated from the remainder of the skirt to form a flexible member adapted to be moved transversely of said piston skirt, a piston rod pivotally connected to said piston skirt adjacent said flexible skirt portion, and a link interposed between the flexible skirt portion and the pivotal head of said piston rod, said link having curvilinear near end bearings adapted to engage similar curvilinear recesses in the flexible skirt portion and piston rod head.

8. In a piston construction, the combination of a piston having a depending skirt, a piston rod pivotally connected to said skirt, and a permanently engaged connecting member interposed between the piston rod and skirt adapted to transmit pressure from said rod to said skirt at the outer limit of the piston movement.

In testimony whereof, I affix my signature.

CHARLES Y. KNIGHT.